United States Patent [19]
Desrosiers

[11] Patent Number: 5,996,718
[45] Date of Patent: Dec. 7, 1999

[54] SWING ARM FOR A MOTORCYCLE

[76] Inventor: Denis Desrosiers, 6 Des Pionniers, Causapscal, Canada, G0J 1J0

[21] Appl. No.: 09/063,313

[22] Filed: Apr. 20, 1998

[51] Int. Cl.$^6$ .................................................... B62K 25/00
[52] U.S. Cl. ........................................... 180/227; 280/283
[58] Field of Search ................................... 180/227, 226; 280/283, 284, 275

[56] References Cited

U.S. PATENT DOCUMENTS

| | | | |
|---|---|---|---|
| Re. 26,608 | 6/1969 | Hopkins | 180/227 |
| D. 388,746 | 1/1998 | Davidson . | |
| 2,230,749 | 2/1941 | Hebert . | |
| 4,022,484 | 5/1977 | Davis . | |
| 4,087,109 | 5/1978 | Davis . | |
| 4,540,193 | 9/1985 | Noda . | |
| 4,650,026 | 3/1987 | Shiraishi | 180/227 |
| 4,667,762 | 5/1987 | Ishino et al. . | |
| 4,984,650 | 1/1991 | Horiike . | |
| 5,263,549 | 11/1993 | Dick | 180/227 |
| 5,469,930 | 11/1995 | Wiers . | |
| 5,487,443 | 1/1996 | Thurm . | |
| 5,749,591 | 5/1998 | Thurm | 180/227 |

FOREIGN PATENT DOCUMENTS

| | | | |
|---|---|---|---|
| 171393 | 7/1990 | Japan | 180/227 |

OTHER PUBLICATIONS

Title: "Softail FatTire Adapter Kit", Publication No.: 3131, 2 pages, Date: Unknown, Publisher: Vulcan Engineering Company, Manchester, New Hampshire, U.S.A., Tel: 603–668–6315, This two page publication is given to clients with the purchase of the said kit.

*Primary Examiner*—Lanna Mai
*Assistant Examiner*—Michael Cuff
*Attorney, Agent, or Firm*—Mario D. Theriault

[57] ABSTRACT

A swing arm for customizing the rear wheel of a motorcycle. The swing arm of the present invention is made of a right triangular structure defining a right mounting plane, a left triangular structure defining a left mounting plane, an upper and lower spanner bars joining the forward corners of the right and left triangular structures, and a right arcuated plate joining the right upper and lower corners of the right triangular structure. The right arcuated plate comprises a right pivotal connection along a pivotal axis of the swing arm, and this right pivotal connection is connectable to the frame of the motorcycle. There is further provided a left arcuated plate connected to the upper and lower spanner bars at a distance from the left mounting plane. The left arcuated plate comprises a left pivotal connection along the pivotal axis, and this left pivotal connection is connectable to the frame of the motorcycle. The distance between the left arcuated plate and the left mounting plane is greater than a width of the drive belt driving the rear wheel of the motorcycle, such that when the swing arm of the present invention is adapted to be mounted to the frame of the motorcycle, the drive belt is mountable between the left arcuated plate and the left mounting plane. The displacement of the drive belt toward the left mounting plane provides more space inside the swing arm for installing an oversize tire on the rear wheel.

20 Claims, 6 Drawing Sheets

SWING ARM FOR A MOTORCYCLE

FIELD OF THE INVENTION

This invention relates to a swing arm for a motorcycle and more particularly, it relates to the structure of a swing arm which allows for the installation of an oversize rear wheel tire on a Harley-Davidson Softail™ motorcycle.

BACKGROUND OF THE INVENTION

Large motorcycles are often the pride of their owners. These machines are especially appreciated for their distinct appearance, distinct sound and high performance. Generally, the owners of large motorcycles are independent, original and creative individuals who like to appose a personal touch to the appearance or to the engine performance of their motorcycles. Therefore, original equipment manufacturers as well as generic component fabricators offer large assortments of custom parts and accessories for customizing these motorcycles to satisfy a great number of different preferences.

A common modification performed by motorcycle owners is the replacement of the original rear wheel tire by a wider one. This modification enhances the expression of power and performance of the machine.

The original rear wheel tire on a Harley-Davidson Softail™ motorcycle is a series 130 mm (5.1 inches). The width of the frame allows for the installation of a series 160 mm (6.3 inches) tire. This modification requires the displacement of the transmission, the inner primary housing and the rear sprocket, toward the drive side of the engine, and the replacement of the drive shaft extension with a longer one. A component kit for doing this modification, is available from Vulcan Engineering Company, from Manchester, N.H., U.S.A. A two-page product bulletin no. 3131 describing this kit is incorporated herein by reference.

A major obstacle to the placement of a wider rear wheel tire on those motorcycles is the maximum available space inside the swing arm of the rear wheel suspension, and the space taken up by the flat drive belt between the rear wheel and the left arcuated side plate of the swing arm.

It is known that the more audacious handymen have successfully installed rear wheel tires larger than those of a series 160 mm (6.3 inches) on these motorcycles. This was done by cutting and welding and drastically modifying the original frame of the motorcycle. These modifications are often done at the expense of adversely affecting the alignment of both wheels, changing the original center of gravity of the motorcycle, or loosing the original strength of the frame. For safety reasons, modifications to the main frame of the motorcycle are not recommendable.

SUMMARY OF THE INVENTION

In the present invention, however, there is provided a swing arm for a motorcycle's rear wheel suspension system, which allows for the installation of an oversize rear wheel tire therein. In one aspect of the present invention, there is provided a swing arm for pivotal attachment to a motorcycle frame, for supporting a rear wheel of the motorcycle wherein the rear wheel is driven by flat drive belt. The swing arm comprises a right mounting plane; a left mounting plane spaced apart from and parallel to the right mounting plane; a central axis equally spaced between the right mounting plane and the left mounting plane, and a pivotal axis aligned perpendicularly relative to both mounting planes.

The swing arm of the present invention also comprises a right triangular structure along the right mounting plane. This right triangular structure comprises a right upper corner, a right lower corner and a right rearward vertex comprising a right wheel mount connectable to the right side of the rear wheel.

The swing arm also comprises a left triangular structure along the left mounting plane. This left triangular structure comprises a left upper corner, a left lower corner and a left rearward vertex having a left wheel mount connectable to a left side of the rear wheel.

There is also provided an upper spanner bar connected to the right and left upper corners of the triangular structures; a lower spanner bar connected to the right and left lower corners; a right arcuated plate joining the upper and lower corners of the right triangular structure and being aligned within the right mounting plane. This right arcuated plate comprises a right pivotal connection along the pivotal axis of the swing arm, and this pivotal connection is connectable to the frame of the motorcycle.

There is further provided a left arcuated plate connected to the upper and lower spanner bars at a distance from the left mounting plane toward the central axis. The left arcuated plate comprises a left pivotal connection along the pivotal axis of the swing arm, and this pivotal connection is also connectable to the frame of the motorcycle.

The distance between the left arcuated plate and the left mounting plane is greater than a width of the drive belt of the motorcycle, such that when the swing arm of the present invention is adapted to be mounted to the frame of the motorcycle, the drive belt is mountable between the left arcuated plate and the left mounting plane.

The primary advantage of this installation is that the displacement of the drive belt toward the left side of the motorcycle allows for the installation of an oversized tire on the rear wheel. In fact, this is an essential factor for allowing a proper installation of an oversize tire of a series 200 mm (7.8 inches) for example on the rear wheel.

In accordance with another aspect of the present invention, there is provided a draw block connected to the lower spanner bar, and each of both shock absorbers of the motorcycle has a first end affixed to the draw block. This draw block has a threaded rod extending therefrom and engaged in a threaded hole in an anchor block affixed to the lower spanner bar. The threaded engagement of the threaded rod into the anchor block provides a means for varying a position of the draw block relative to lower spanner bar, for varying a pivotal displacement of the swing arm relative to the frame of the motorcycle. The adjustment described above is particularly advantageous for lowering the seat of the motorcycle and for enhancing the low profile appearance of the motorcycle. This feature is applicable in combination with the oversize rear wheel tire described above such that the customizing of a motorcycle using the swing arm of the present invention simultaneously provides for the installation of an oversize rear tire and the acquirement of a low rear end profile.

The structure of the swing arm of the present invention is relatively simple. It is therefore particularly appropriate for being marketed as part of kit for installation using common hand tools only with limited instructions. The kit containing the swing arm of the present invention also comprises the required spacers, bolts and other modified components. A person having reasonable skills in motorcycle mechanics using the described kit can customize a motorcycle without having to cut, weld or otherwise affect the alignment of the original frame of the motorcycle.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENT

Figure 1:
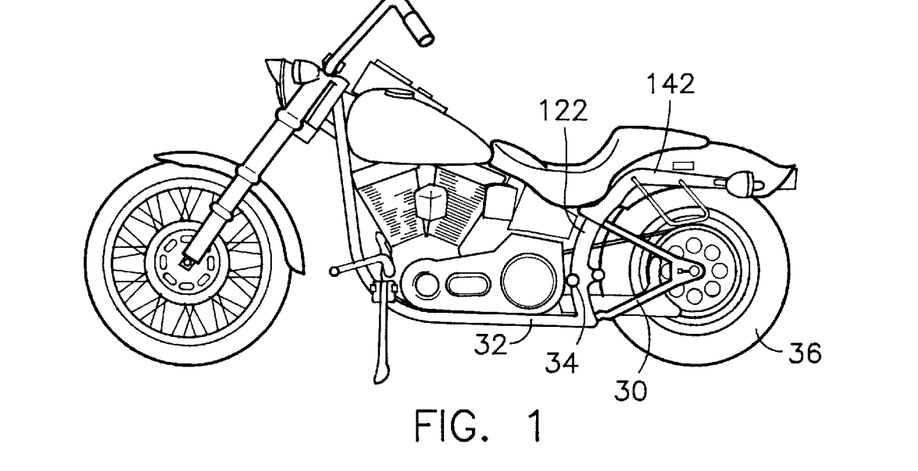
FIG. 1 is a reference drawing illustrating a motorcycle having a rear wheel suspension system using a swing arm of the type described herein.
Figure 2:
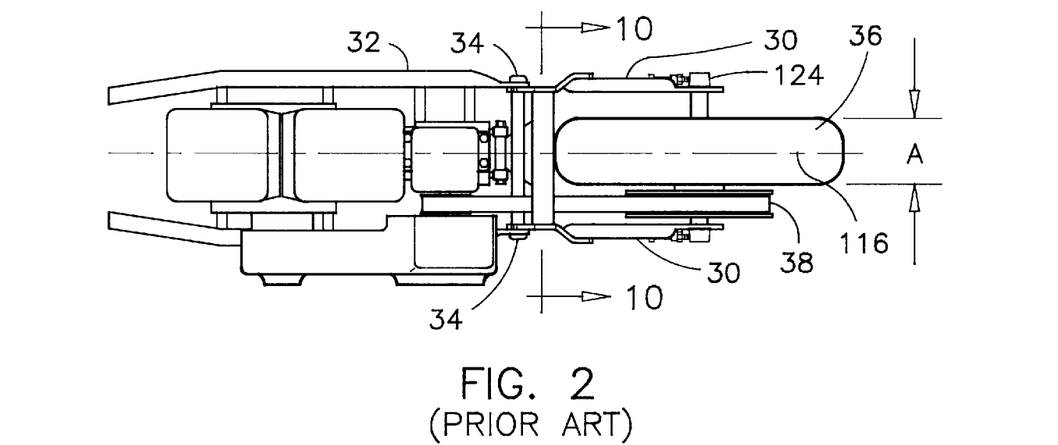
FIG. 2 is also a reference drawing illustrating a partial top view of a motorcycle having an original swing arm and an original rear wheel tire.
Figure 3:
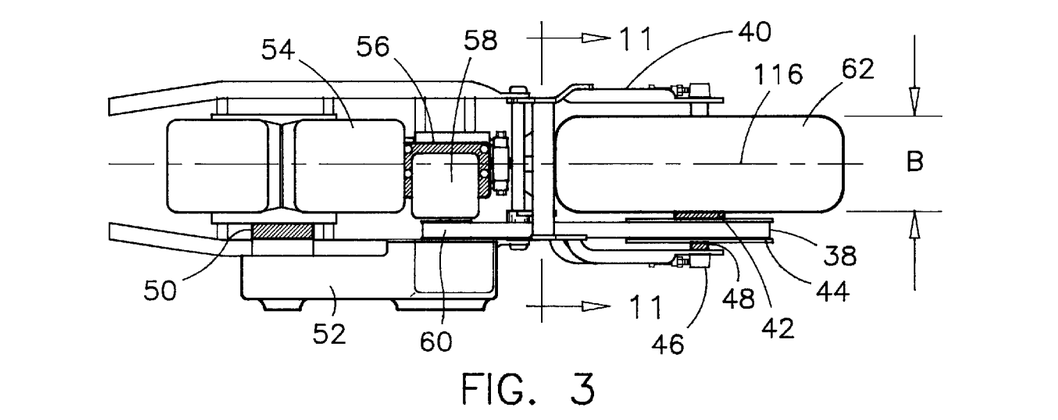
FIG. 3 is a partial top view of a motorcycle having the swing arm of the preferred embodiment and an oversize rear wheel tire.

Referring particularly to FIGS. 1–3, the illustrations represent a Harley-Davidson Softail™, motorcycle having rear wheel suspension system using a swing arm of interest herein. The swing arm 30 of that motorcycle comprises a pair of spaced apart triangular structures supporting the rear wheel. The swing arm 30 is pivotally connected to the frame 32 of the motorcycle and is movable up and down about pivot axis 34. The movement of the swing arm 30 is controlled by a pair of shock absorbers mounted in a lower region of the frame 32.

The original rear wheel tire 36 on a Harley-Davidson Softail™ motorcycle is normally from a series 130 having a width A of about 130 mm (5.1 inches). Although this type of tire is recommended by the manufacturer, it is believed that there are sufficient clearance between the drive belt and the tire for installing at least a narrow style tire within the series 140 mm (5.5 inches) on an original rim, hub and driven sprocket. The installation of a series 160 mm (6.3 inches) tire requires new spacers on the driven sprocket as explained earlier, and the displacement of the transmission toward the drive side of the rear wheel.

However, the installation of a rear wheel tire having a width over 160 mm (6.3 inches) is not possible due to the fact that the flat drive belt 38 is confined between the left arcuated side plate of the swing arm 30 and the tire 36.

Figure 22:
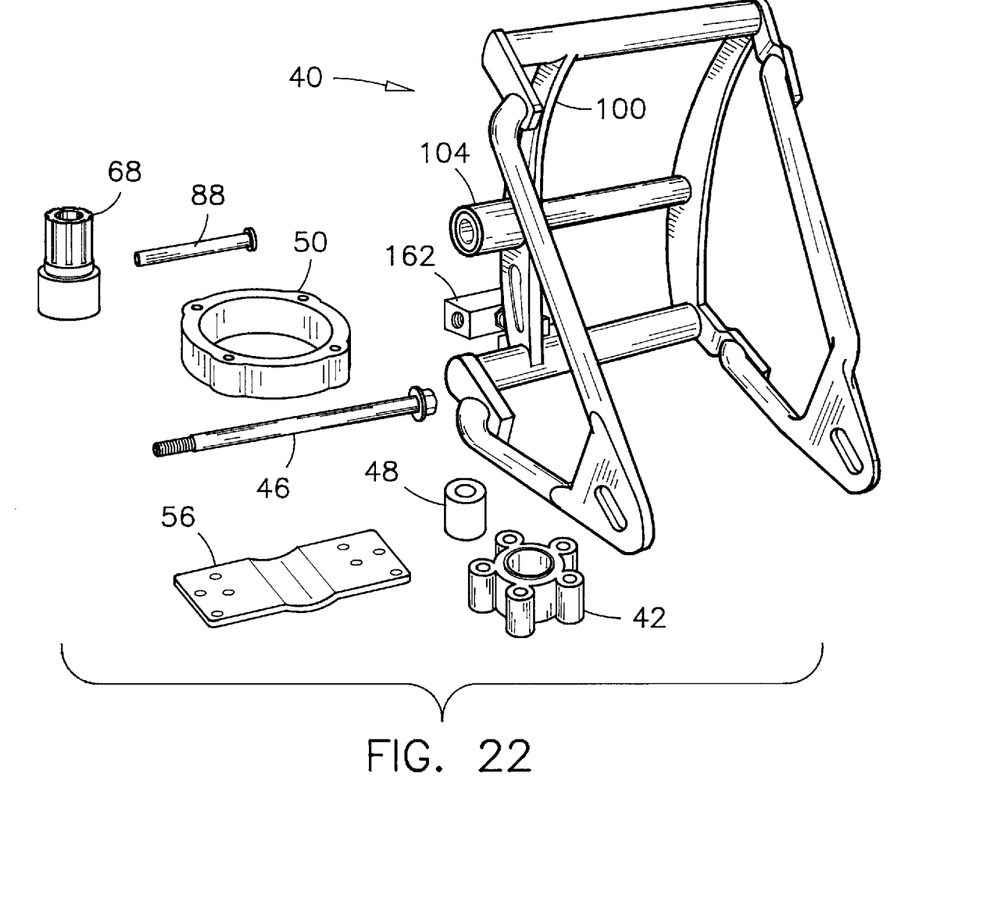
FIG. 22 is a component kit containing the swing arm of the preferred embodiment, for installing an oversize tire on a rear wheel of a motorcycle.

In the swing arm 40 of the preferred embodiment, the left side plate is relocated inward relative to the swing arm as will be described later, such that the flat drive belt 38 of the motorcycle may be moved outwardly by about 32 mm (1-¼ inches). It will be appreciated that this modification is accompanied by the addition of a sprocket spacer 42 between the driven sprocket 44 and the wheel hub, of a longer rear axle 46 and an axle spacer 48 on the longer rear axle. This modification is also accompanied by the addition of a primary housing spacer 50 between the inner primary housing 52 and the engine 54 for moving the inner primary housing 52 outwardly by 32 mm (1-¼ inches); a new drive shaft extension 68 and drive shaft extension retaining bolt 88 (illustrated in FIG. 22), and a new transmission support plate 56 for re-positioning the transmission 58 and the drive sprocket 60 outwardly by 32 mm (1-¼ inches). These modifications in a broad sense, increase the available space within the swing arm 40 and allow for the installation therein of a rear wheel tire 62 from a series 200 having a nominal width B of about 200 mm (7.8 inches).

Referring now particularly to FIGS. 4–8 there are illustrated therein for reference purposes, an original swing arm 30, and a swing arm of the preferred embodiment 40. The swing arm 30 of the prior art comprises a right and left triangular structures which are labelled with numerals 70,72 respectively. The right and left sides are determined by the position of the driver of the motorcycle. The rearmost point of each triangular structure 70,72 has an axle attachment member labelled as 74,74' respectively. The forward end of each triangular structure 70,72 is an arcuated side plate shown as 76,78. Both triangular structures 70,72 are held at a distance from one another by an upper spanner bar 80, a lower spanner bar 82 and an intermediate spanner bar 84 mounted between the left and right arcuated side plates 76,78. Each arcuated side plates 76,78 has a bearing seat 86 therein for receiving a respective bearing on which depends the movements of the suspension of the motorcycle.

Figures 4, 5, 6, 7, 8, 9:
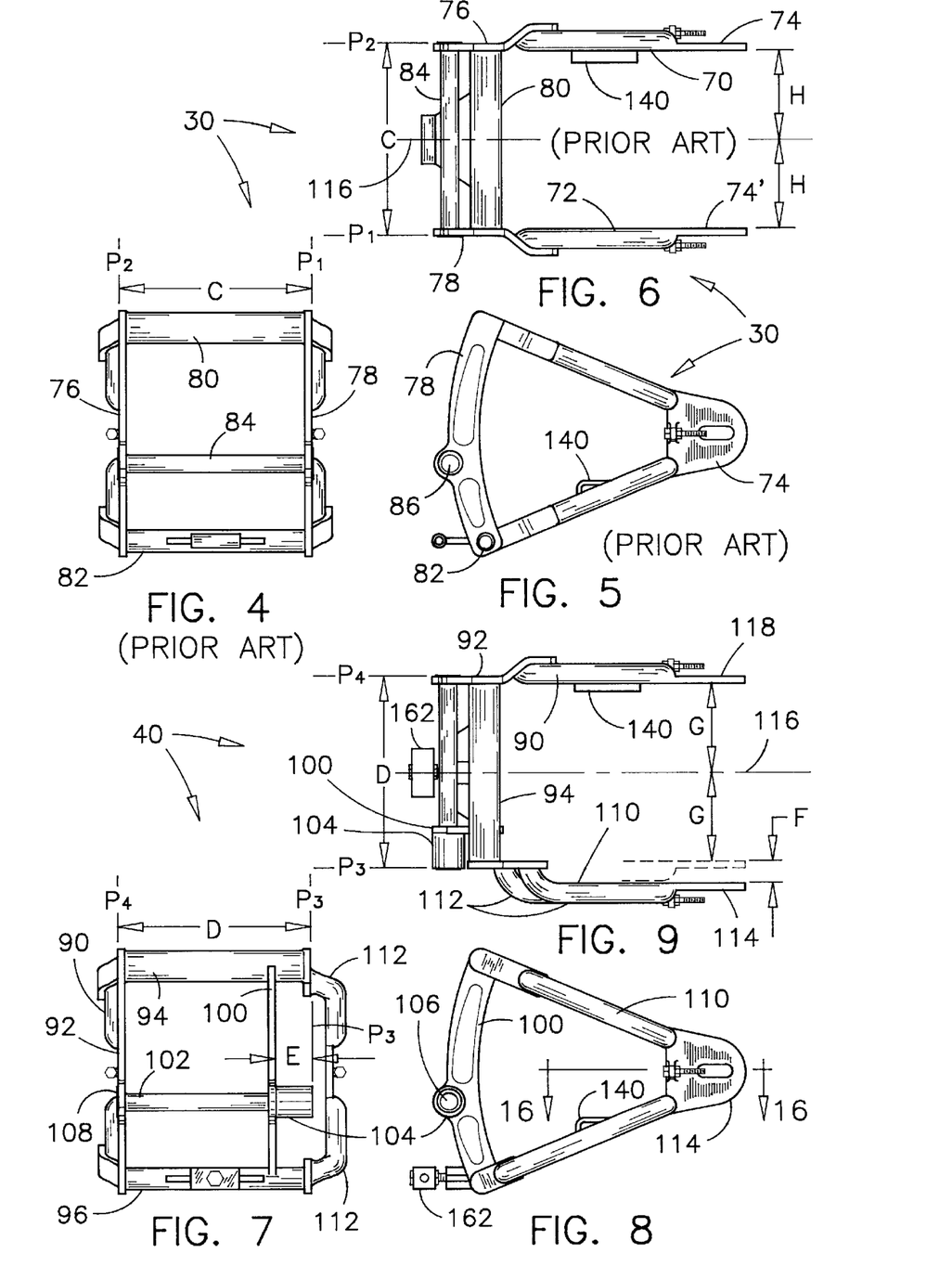
FIG. 4 is a reference drawing showing a front view of an original swing arm.
FIG. 5 is a side view of the swing arm in FIG. 4.
FIG. 6 is a top view of the swing arm in FIG. 4.
FIG. 7 is a front view of the swing arm of the preferred embodiment.
FIG. 8 is a side view of the swing arm of the preferred embodiment.
FIG. 9 is a top view of the swing arm of the preferred embodiment.

The outside surfaces of the arcuated side plates 76,78 define parallel planes $P_1$ and $P_2$ which are spaced apart by a nominal distance C as illustrated in FIGS. 4 and 6. Parallel planes $P_1$ and $P_2$ represent the mounting planes of the swing arm into the main frame 32 of the motorcycle.

Referring now to FIGS. 7–9, the swing arm of the preferred embodiment 40 is identical to the original swing arm 30 in many aspects. The right triangular structure 90 of the swing arm of the preferred embodiment 40 and the arcuated right side plate 92 thereof are identical in size and shape to the right triangular structure 70 and right side plate 76 of the original swing arm 30. Similarly, the upper and lower spanner bars 94,96 of the swing arm of the preferred embodiment 40 are identical in length to the upper and lower spanner bars 80, 82 of the original swing arm 30.

The mounting planes $P_3$ and $P_4$ of the swing arm of the preferred embodiment 40 are parallel to one another and spaced apart a distance D which identical to the nominal spacing C between the mounting planes $P_1$, $P_2$ of the original swing arm 30, such that the swing arm of the preferred embodiment 40 is mountable in the main frame 32 as a replacement of the original swing arm 30, without modifications to the main frame 32.

In the swing arm of the preferred embodiment, the left arcuated side plate 100 is welded to the upper and lower spanner bars 94,96, at an intermediate position along the upper and lower spanner bars 94,96. This intermediate position is spaced a distance E of about 38–50 mm (1-½ to 2 inches) from the left mounting plane $P_3$ as best illustrated in FIG. 7. The intermediate spanner bar 102 is kept at its original length and is installed through the right arcuated side plate 92. A hollow boss 104 having a bearing seat 106 therein is welded to the outside surface of the left arcuated side plate 100, with its interior cylindrical surface overlapping the intermediate spanner bar 102, and with the axis thereof being in line with the axis of the intermediate spanner bar 102 and of the bearing seat 108 in the right arcuated side plate 92. The purpose of the boss 104 is to position the bearing seat 106 along the mounting plane $P_3$, for obtaining the same pivotal structure as with the original swing arm 30. It will be appreciated that the length of the boss 104 is a same dimension as distance E between the left arcuated side plate 100 and the mounting plane $P_3$.

The left triangular structure 110 in the swing arm 40 of the preferred embodiment has curvatures 112 therein for enlarging the distance between the left axle support member 114 and a central axis 116 of the motorcycle relative to the distance G between the right axle support member 118 and the center line 116. Referring to FIG. 9, the preferred enlargement dimension F is about 32 mm (1-¼ inches). For reference purposes, the dimensions G in this illustration are identical to the dimensions H in FIG. 6 between the axle support members 74,74' in the original swing arm 30.

Figure 10:
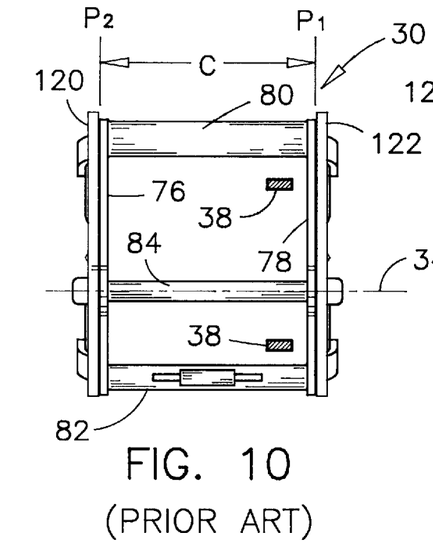
FIG. 10 is a cross section view of the structure of the rear wheel suspension of a motorcycle as seen along line 10—10 in FIG. 2.
Figure 11:
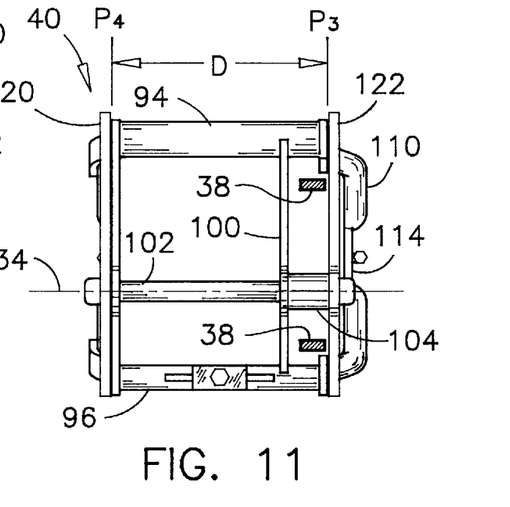
FIG. 11 is a cross section of the structure of a rear wheel suspension of a motorcycle as seen along line 11—11 in FIG. 3.
Figure 12:
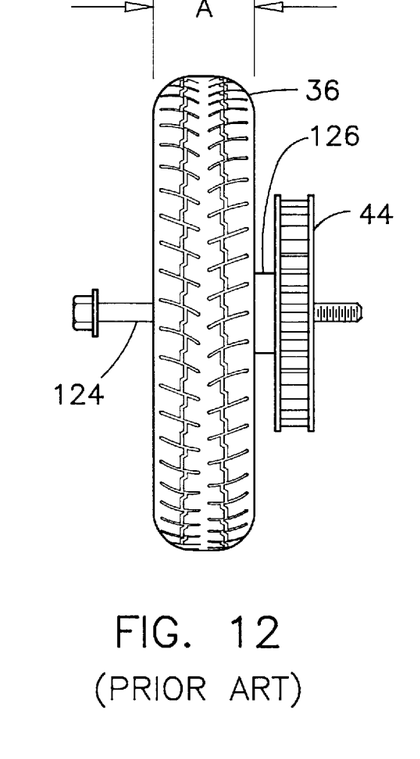
FIG. 12 is a reference drawing illustrating an original rear wheel tire of the motorcycle having an original swing arm, as partly illustrated in FIG. 2.

In order to better appreciate the advantages of the structure of the swing arm of the preferred embodiment 40, reference is now made to FIGS. 10 and 11. In FIG. 10 particularly, there is illustrated a cross-section of the frame 32 of a motorcycle having an original swing arm 30 mounted therein. In this original installation, the swing arm is mounted between a right and left brace plates 120,122 which are part of the motorcycle frame 32 as partly illustrated in FIG. 1.

Similarly, the swing arm of the preferred embodiment 40 illustrated in FIG. 11 is mountable between the right and left brace plates 120,122 of the motorcycle frame 32. In this later installation, however, the drive belt 38 is mountable between the left brace plate 122 and the left arcuated side plate 100. The drive belt 38 in the later installation is about 32 mm (1-¼ inches) more to the left side of the motorcycle than in the original installation.

Figure 13:
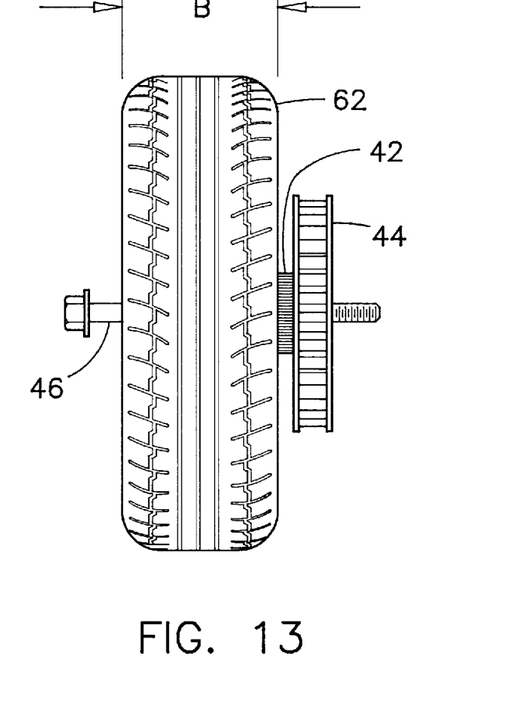
FIG. 13 is a reference drawing illustrating an oversize rear wheel tire of a motorcycle having the swing arm of the preferred embodiment, as partly illustrated in FIG. 3.

The displacement of the drive belt 38 toward the left side of the motorcycle is a primary factor for allowing the installation of a wider rear wheel tire 62 as illustrated in FIGS. 3 and 13. It will be appreciated by those skilled in the art that the installation of a wider rear wheel tire 62 in the swing arm of the preferred embodiment requires other modifications of a less extensive nature. Specifically, there are required a new axle 46 which is longer than the original axle 124; a new driven sprocket spacer 42 which is 32 mm (1-¼ inches) thicker than the original spacer 126. Furthermore, as it was mentioned earlier there are also required an axle spacer 48, a primary housing spacer 50; a new drive shaft extension 68 and drive shaft extension retaining bolt 88, and a new transmission support plate 56.

Figure 14:
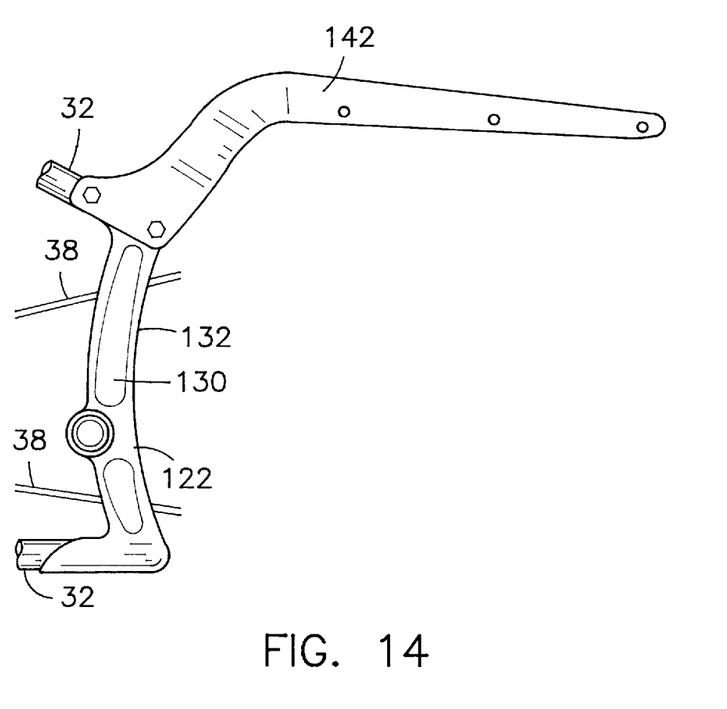
FIG. 14 is a partial side view of a motorcycle frame illustrating the left brace plate supporting the rear wheel suspension.
Figure 15:
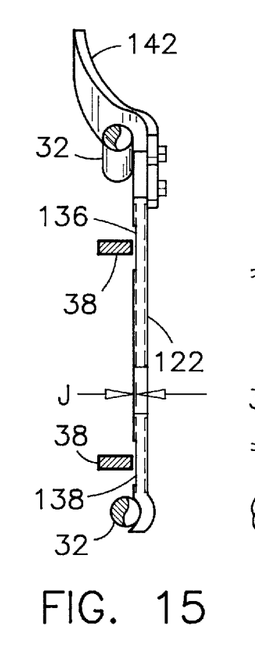
FIG. 15 is a front view of the left brace plate shown in FIG. 14.

A modification to the left brace plate 122 is also recommended to maintain a proper clearance between the drive belt 38 and the left brace plate 122. Referring now to FIGS. 14 and 15, the left brace plate 122 is a casting comprising a web portion 130 enclosed by a flanged portion 132. In the installation of the swing arm of the preferred embodiment 40, it is recommended to file or grind two notches 136,138 in the flange portion 132 on the inside surface of the left brace plate 122, in the vicinity of the path of the drive belt 38 as illustrated in FIG. 15. A preferred depth J of these notches is between about 1.5 mm to about 2.5 mm (0.060 to 0.100 inch). The depth J is sufficient for providing adequate clearance between the drive belt 38 and the left side brace plate 122 in the new installation. Concurrently, the depth of these notches is believed to be insufficient for adversely affecting the structural integrity of the left brace plate 122.

Figure 16:
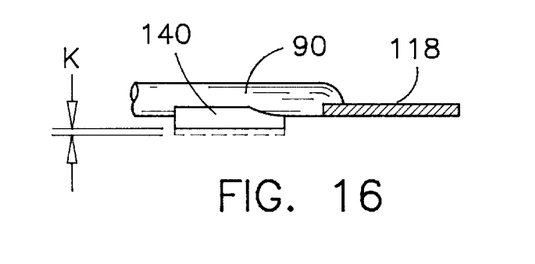
FIG. 16 is a plan view of an anchor bracket for retaining the alignment of the brake calliper relative to the swing arm.

Another detail of interest in the swing arm of the preferred embodiment 40 for installing a rear wheel tire 62 of a series 200, is described herein below with reference to FIG. 16. The width of the anchor bracket 140 for retaining the brake calliper assembly (not shown) should be slightly reduced to accommodate the wider tire. The preferred width reduction of this bracket 140 is between about 9.5 mm to about 12.7 mm (about ⅜ inch to about ½ inch) as represented by dimension K in FIG. 16.

It is further recommended that a wider rear wheel fender be obtained for covering the wider rear wheel. In this respect, modifications to both fender support struts 142 will be required to support the wider rear wheel fender (not shown). This modification is not illustrated herein for being common to those who are skilled in motorcycle mechanics.

The structural details and modifications taught herein are for easily installing on a Harley-Davidson Softail™ motorcycle having original components, a series 200 tire mounted on a 140 or 152 mm (5-½ or 6 inches) wide rim. It will be appreciated that some of the modifications and instructions described herein are not absolutely required if the tire to be installed is narrower than 200 mm (7.87 inches), or if non-original components are used. For example, an alternative to grinding the left side brace plate 122 is to install a narrow drive belt 38, a drive chain or other similar narrow wrap-around drive member with corresponding drive and driven sprockets. Similarly an alternative to grinding the anchor bracket 140 supporting the brake calliper is to install the 200 series tire on a 127 mm or 140 mm wide rim (5 or 5-½ inches) such that the total width of the tire is somewhat reduced from its maximum nominal value.

For these reasons, it will appreciate that the instructions given herein are for easily installing a series 200 rear wheel tire on a Harley-Davidson, Softail™ motorcycle having an original drive belt, and for ensuring that adequate clearance will be maintained on both sides of the oversize tire.

A notable advantage of the swing arm of the preferred embodiment 40 is that the alignment of the rear wheel remains the same whether the tire width is from a series 130 or 200. The right side triangular structure 90 of the swing arm of the preferred embodiment remains unchanged relative to the original swing arm 30 or to the mounting planes thereof. The position of the rim of the rear wheel is referenced to the right mounting plane $P_4$. Therefore, the alignment of the rear wheel relative to the central axis of the motorcycle and to the front wheel is automatically maintained.

Figure 17:
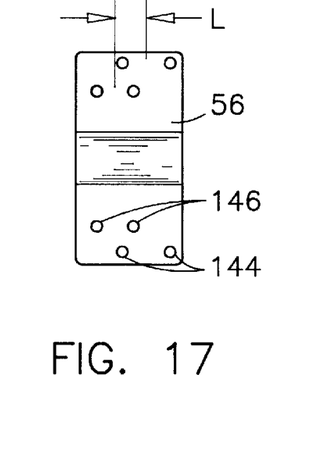
FIG. 17 is a plan view of a new transmission support plate for installing an oversize rear wheel tire on a motorcycle.
Figure 18:
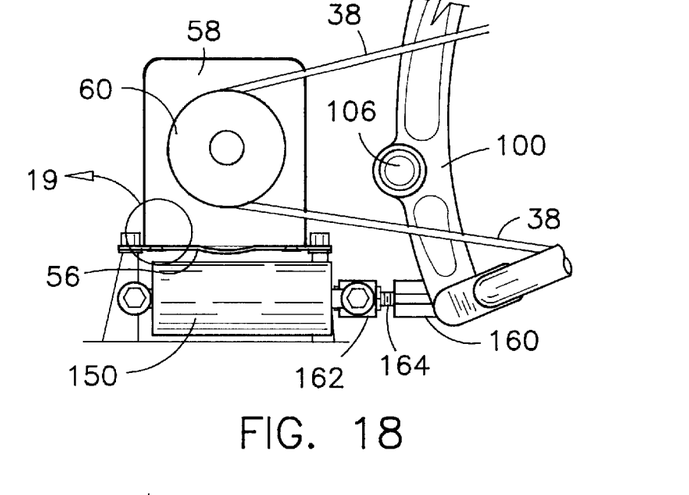
FIG. 18 is a partial elevation view of the transmission of the motorcycle in FIG. 3, and a partial side view of the swing arm of the preferred embodiment, showing one of the shock absorbers of the rear wheel suspension.
Figure 19:
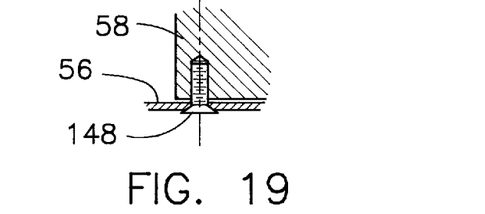
FIG. 19 is a partial cross section of the attachment of the transmission to the new support plate at the location indicated by detail circle 19 in FIG. 18.

Another manufacturing instruction of a minor nature, but still worth consideration is related to the new transmission support plate 56. The first set of holes 144 securing the new plate 56 to the motorcycle frame 32 is offset from the second set of holes 146 for securing the base plate to the transmission 58. The offset distance L as indicated in FIG. 17 is about 32 mm (1-¼ inches). Because of this offset distance, a pair of holes 146 may be positioned immediately above the left side shock absorber 150. Therefore, it is recommended to re-affix the transmission 58 to the new base plate 56 using flat countersunk head cap screws 148, as illustrated in FIGS. 18 and 19, to prevent the screws from touching the casing of the left shock absorber 150 of the suspension system, as may be the case if hexagon head type screws were used.

Another novel feature has been incorporated in the swing arm of the preferred embodiment 40 for further customizing a motorcycle. There is provided in the new swing arm 40, an adjustment means for adjusting the suspension system in up and down directions.

A particularity of the Harley-Davidson motorcycles is their low profile. Many owners of those motorcycles enjoy this feature, and would like to have the possibility to further reduce the height of the seat. The additional feature of the swing arm of the preferred embodiment offers this possibility in cooperation with the installation of the wider tire.

Figure 20:
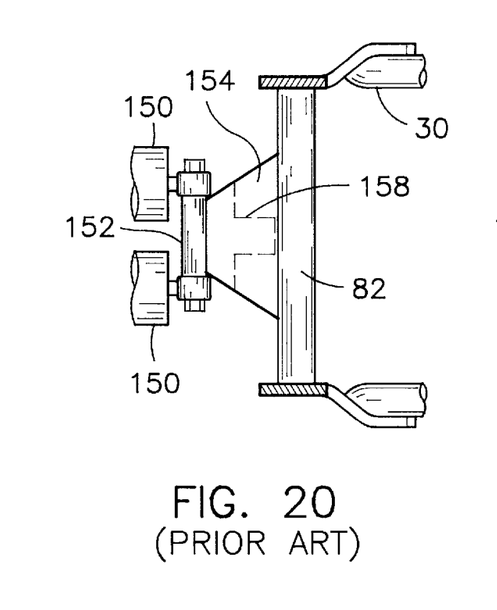
FIG. 20 is a plan view of an attachment of the shock absorbers to a swing arm of the prior art.
Figure 21:
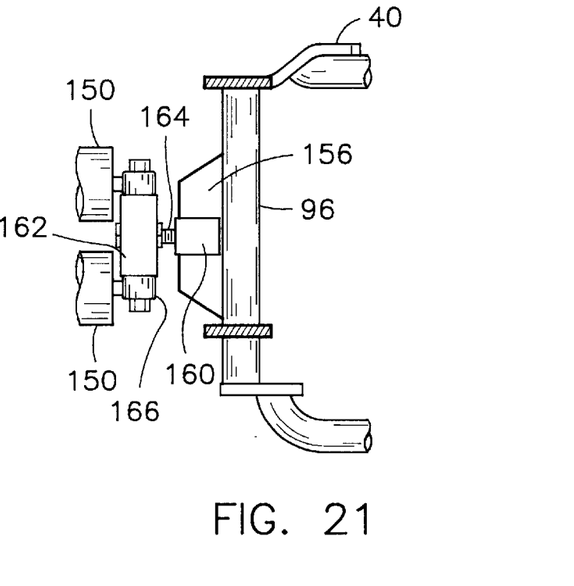
FIG. 21 is a plan view of an attachment of the shock absorbers to the swing arm of the preferred embodiment.

The shock absorbers 150 in the original suspension system are affixed to an anchor bar 152 and gusset plate 154 connected to the lower spanner bar 82. In the swing arm 40 of the preferred embodiment, however, the new gusset plate 156 is a portion of the original gusset plate 154, as represented by cutout line 158 on the original gusset plate 154. An anchor block 160 is welded into the cutout portion of the new gusset plate 156. The anchor block 160 has a threaded hole therein (not shown) facing forwardly. A draw block 162 with a threaded rod 164 extending from the central region thereof in engaged in the threaded hole (not shown) of the anchor block 160, and is adjustable forward and backward by increasing or reducing the distance between the draw block 162 and the anchor block 160. Both shock absorbers 150 are connected to the draw block 162. The threaded connection of the threaded rod 164 into the anchor block 160 allows for the adjustment of the suspension in up and down direction. It has been found that this adjustment allows for the lowering of the seat of the motorcycle over a vertical distance of about 38 mm (1-½ inches) as compared to the original height of the seat, while maintaining significant upward travel for shock absorption. It will be appreciated that the significant upward travel for shock absorption mentioned above is believed to be sufficient for street riding at relatively low speed. Some users will probably prefer to raise the suspension to the original height when travelling far distances with baggages and a companion. The swing arm of the preferred embodiment 40 is therefore useful for customizing the rear wheel of a motorcycle while providing the option of giving the motorcycle a lower profile appearance.

While the above description provides a full and complete disclosure of the preferred embodiment of this invention for customizing a motorcycle, various modifications, alternate constructions and equivalents may be employed without departing from the true spirit and scope of the invention. Such changes might involve alternate components, structural arrangements, operable features or the like, or the application of the invention to motorcycles other than the specific model described herein. Similarly, the above disclosure describes the structural details of a swing arm which is delivered to the end user in its final form. Those skilled in the art will appreciate that the instructions provided herein are sufficient to an end user having access to metal working equipment to cut, gouge, weld and machine an original swing arm for obtaining the customized swing arm of the preferred embodiment. Therefore the above description and accompanying illustrations should not be construed as limiting the scope of the invention which is defined by the appended claims.

I claim:

1. A swing arm for pivotal mounting to a motorcycle frame for supporting a rear wheel of said motorcycle wherein said rear wheel is driven by a wrap-around drive member, said swing arm comprising:

a right mounting plane, a left mounting plane spaced apart from and parallel to said right mounting plane; a central axis equally spaced between said right and left mounting planes, and a pivotal axis aligned perpendicularly relative to both said mounting planes a right triangular structure along said right mounting plane; said right triangular structure comprising a right upper corner, a right lower corner and a right rearward vertex comprising a right axle support member;

a left triangular structure along said left mounting plane; said left triangular structure comprising a left upper corner, a left lower corner and a left rearward vertex having a left axle support member;

an upper spanner bar connected to said right and left upper corners;

a lower spanner bar connected to said right and left lower corners;

a right arcuated plate joining said right upper corner and said right lower corner, and being aligned within said right mounting plane;

said right arcuated plate comprising a right pivotal connection means along said pivotal axis, said right pivotal connection means being connectable to said motorcycle frame;

a left arcuated plate connected to said upper spanner bar and to said lower spanner bar at a distance from said left mounting plane toward said central axis, said left arcuated plate comprising a left pivotal connection means along said pivotal axis, said left pivotal connection means being connectable to said motorcycle frame;

said distance between said left arcuated plate and said left mounting plane is such that when said swing arm is adapted to be mounted to said motorcycle frame, said drive member is mountable between said left arcuated plate and said left mounting plane.

2. A swing arm as claimed in claim 1, wherein said distance between said left arcuated plate and said left mounting plane is between about 38 mm to about 51 mm (about 1-¼ inches to about 2 inches).

3. A swing arm as claimed in claim 1, wherein said left pivotal connection means is a cylindrical boss affixed to said left arcuated plate, and said boss extends from said left arcuated plate to said left mounting plane.

4. A swing arm as claimed in claim 3, wherein said boss comprises a bearing seat therein and said bearing seat is aligned with said left mounting plane.

5. A swing arm as claimed in claim 1 further comprising an intermediate spanner bar extending between said right pivotal connection means and said left pivotal connection means.

6. A swing arm as claimed in claim 1 wherein said left triangular structure is bent outwardly relative to said central axis, and said left axle support member is spaced away from said left mounting plane by an offset distance.

7. A swing arm as claimed in claim 6 wherein said offset distance is about 32 mm (1-¼ inches).

8. A suspension system for a motorcycle comprising:
a frame;
a swing arm pivotally mounted to said frame on a pivotal axis;
a wheel pivotally mounted in said swing arm;
a wrap-around drive member connected to said wheel; and
a pair of shock absorbers connected to said frame and to said swing arm;
said swing arm comprising:
  a right mounting plane, a left mounting plane spaced apart from and parallel to said right mounting plane; a central axis equally spaced between said right and left mounting planes, and said pivotal axis being aligned perpendicularly relative to both said mounting planes
  a right triangular structure along said right mounting plane; said right triangular structure comprising a right upper corner, a right lower corner and a right rearward vertex comprising a right axle support member;
  a left triangular structure along said left mounting plane; said left triangular structure comprising a left upper corner, a left lower corner and a left rearward vertex having a left axle support member;
  an upper spanner bar connected to said right and left upper corners;
  a lower spanner bar connected to said right and left lower corners;
  a right arcuated plate joining said right upper corner and said right lower corner, and being aligned within said right mounting plane;
  said right arcuated plate comprising a right pivotal connection means along said pivotal axis, said right pivotal connection means being connected to said frame;
  a left arcuated plate connected to said upper spanner bar and to said lower spanner bar at a distance from said left mounting plane toward said central axis, said left arcuated plate comprising a left pivotal connection means along said pivotal axis, said left pivotal connection means being connected to said frame;
  said distance between said left arcuated plate and said left mounting plane is such that when said swing arm is adapted to be mounted to said motorcycle frame, said drive member is mountable between said left arcuated plate and said left mounting plane.

9. A suspension system as claimed in claim 8 wherein said left triangular structure of said swing arm is bent outwardly relative to said central axis, and said left axle support member is spaced away from said left mounting plane by an offset distance of about 32 mm (1-¼ inches).

10. A suspension system as claimed in claim 9 wherein said rear wheel has a tire thereon and said tire has a nominal width of about 200 mm (7.8 inches).

11. A suspension system as claimed in claim 10 wherein said rear wheel has a rim width of between about 140 mm (5-½ inches) and about 152 mm (6 inches).

12. A suspension system as claimed in claim 8 wherein said swing arm further comprises a draw block affixed to said lower spanner bar, and each of said shock absorbers has a first end thereof affixed to said draw block; and said draw block comprises adjustment means for varying a position thereof relative to said lower spanner bar and for varying a pivotal displacement of said swing arm relative to said frame.

13. A suspension system as claimed in claim 12 wherein said draw block has a threaded rod extending therefrom, and said lower spanner bar has an anchor block affixed thereto, and said anchor block has a threaded hole therein, and said adjustment means is an engagement of said threaded rod into said threaded hole.

14. A method for modifying a suspension system of a motorcycle for customizing said motorcycle, wherein said motorcycle comprises a frame, a swing arm pivotally mounted to said frame along a pivotal axis, a rear wheel mounted in said swing arm, and a wrap-around drive member connected to said rear wheel; said swing arm comprising:
  a right mounting plane, a left mounting plane spaced apart from and parallel to said right mounting plane; a central axis equally spaced between said right and left mounting planes, and said pivotal axis being aligned perpendicularly relative to both said mounting planes;
  a right triangular structure along said right mounting plane; said right triangular structure comprising a right upper corner, a right lower corner and a right rearward vertex comprising a right axle support member;
  a left triangular structure along said left mounting plane; said left triangular structure comprising a left upper corner, a left lower corner and a left rearward vertex having a left axle support member;
  an upper spanner bar connected to said right and left upper corners;
  a lower spanner bar connected to said right and left lower corners;
  a right arcuated plate joining said right upper corner and said right lower corner, and being aligned within said right mounting plane;
  said right arcuated plate comprising a right pivotal connection means along said pivotal axis, said right pivotal connection means being connected to said frame;
  a left arcuated plate joining said left upper corner and said left lower corner, and being aligned within said left mounting plane; and
  said left arcuated plate comprising a left pivotal connection means along said pivotal axis, said left pivotal connection means being connected to said frame;
said method comprising the steps of:
  removing said rear wheel from said swing arm;
  removing said swing arm from said frame;
  gouging said left arcuated plate from said upper and lower spanner bars;
  moving said left arcuated plate inward relative to said left mounting plane by a nominal distance, wherein said nominal distance is greater than a width of said drive member;
  welding said left arcuated plate to said upper and lower spanner bars at said nominal distance from said left mounting plane;
  mounting said swing arm to said frame;
  installing said drive member between said left arcuated plate and said left mounting plane; and
  installing said rear wheel in said swing arm.

15. A method as claimed in claim 14 wherein the step of moving said left arcuated plate inward relative to said left mounting plane by a nominal distance such that said nominal distance is between about 38 mm (1-½ inches) to about 51 mm (2 inches).

16. A method as claimed in claim 15 further comprising the step of: bending and extending said left triangular structure outwardly relative to said central axis, such that said left axle support member is spaced outwardly from said left mounting plane, by an offset dimension.

17. A method as claimed in claim 16 wherein the step of bending and extending said left triangular structure outwardly relative to said central axis, such that said left axle support member is spaced outwardly from said left mounting plane by an offset dimension and said offset dimension is about 32 mm (1-¼ inches).

18. A method as claimed in claim 14 further comprising the additional steps of:
   welding a boss to said left arcuated plate, said boss extending from said left arcuated plate to said left mounting plane, and
   installing a bearing in said boss in alignment with said left mounting plane.

19. A method as claimed in claim 14 further comprising the step of installing on said rear wheel a tire having a nominal width of 200 mm (7.8 inches).

20. A method as claimed in claim 19 further comprising the step of aligning said rear wheel with said central axis.

* * * * *